United States Patent
Haynes et al.

(10) Patent No.: US 9,135,606 B2
(45) Date of Patent: Sep. 15, 2015

(54) CHANGING EMAIL ADDRESSEE CATEGORIZATION

(75) Inventors: Thomas Richard Haynes, Apex, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 13/223,649

(22) Filed: Sep. 1, 2011

(65) Prior Publication Data

US 2013/0060861 A1    Mar. 7, 2013

(51) Int. Cl.
*G06F 15/16* (2006.01)
*G06Q 10/10* (2012.01)

(52) U.S. Cl.
CPC ................... *G06Q 10/107* (2013.01)

(58) Field of Classification Search
CPC . G06Q 10/107; H04L 12/586; H04L 12/5855

USPC .......................... 709/206, 223, 246
See application file for complete search history.

(56) References Cited

U.S. PATENT DOCUMENTS

| 7,237,009 | B1 * | 6/2007 | Fung et al. | 709/206 |
|---|---|---|---|---|
| 7,716,295 | B2 * | 5/2010 | Wilson | 709/206 |
| 7,890,585 | B2 | 2/2011 | Lowe | |
| 8,103,726 | B2 * | 1/2012 | Stoddard et al. | 709/206 |
| 2006/0026244 | A1 * | 2/2006 | Watson | 709/206 |
| 2006/0085504 | A1 * | 4/2006 | Yang et al. | 709/206 |
| 2009/0049140 | A1 * | 2/2009 | Stoddard et al. | 709/206 |
| 2009/0254629 | A1 * | 10/2009 | Bruce et al. | 709/207 |
| 2010/0057861 | A1 * | 3/2010 | Nigam et al. | 709/206 |

* cited by examiner

*Primary Examiner* — Oanh Duong
(74) *Attorney, Agent, or Firm* — Holland & Knight LLP; Brian J. Colandreo, Esq.; Jeffrey T. Placker, Esq.

(57) ABSTRACT

A request to change an addressee category of a received email is received by a computing device. An indication of a changed addressee category is also received by the computing device. The changed addressee category is propagated to one or more instances of the received email.

21 Claims, 6 Drawing Sheets

CHANGING EMAIL ADDRESSEE CATEGORIZATION

BACKGROUND OF THE DISCLOSURES

The present disclosure relates to electronic mail, and more particularly relates to changing addressee categorization within an electronic mail message.

Electronic mail (email) is a very common means of communication. The wide-scale usage of email largely arises from email's convenience of use and speed of conducting communication. One aspect of convenience associated with email is the ability to send a single correspondence to multiple intended recipients, as opposed to separately sending a discrete correspondence to each of the intended recipients.

While a single email may include multiple intended recipients, email often includes conventions that allow the different intended recipients to be distinguished based upon classes or recipient categories. The commonly used conventions often relate to designating various recipients as "to" recipients, "cc," or carbon copy, recipients, and "bcc," or blind carbon copy, recipients when preparing the email. Such conventions may, for example, indicate an importance of the communication to a recipient, with "to" indicating that a recipient is a primary recipient, and "cc" indicating that the recipient is a secondary recipient (who may be receiving the email as a courtesy or to keep them informed on a matter they are not directly involved in). While the meaning of such conventions may vary for different individuals or organizations, the use of such conventions is relatively common.

SUMMARY OF THE DISCLOSURE

According to a first implementation, a method may include receiving, by a computing device, a request to change an addressee category of a received email. An indication of a changed addressee category may also be received by the computing device. The changed addressee category may be propagated to one or more instances of the received email.

One or more of the following features may be included. The addressee category may include one or more of a to recipient category, a carbon copy recipient category, and a blind carbon copy recipient category. The changed addressee category may include one or more of a to recipient category, a carbon copy recipient category, and a blind carbon copy recipient category. The changed addressee category may be limited to one or more of to recipient category and a carbon copy recipient category.

Propagating the changed addressee category may include propagating the changed addressee category in response to receiving an email owner approval. The one or more instances of the received email may include one or more received emails, forwarded emails, reply emails.

The method may further include receiving a request to change one or more of an email text characteristic and an email priority characteristic. A changed email text characteristic or an email priority characteristic may be propagated to the one or more instances of the received email.

According to another implementation, a computer program product includes a computer readable medium having a plurality of instructions stored on it. When executed by a processor, the instructions may cause the processor to perform operations including receiving a request to change an addressee category of a received email. The instructions may also cause the processor to receive an indication of a changed addressee category. The changed addressee category may be propagated to one or more instances of the received email.

One or more of the following features may be included. The addressee category may include one or more of a to recipient category, a carbon copy recipient category, and a blind carbon copy recipient category. The changed addressee category may include one or more of a to recipient category, a carbon copy recipient category, and a blind carbon copy recipient category. The changed addressee category may be limited to one or more of a to recipient category and a carbon copy recipient category.

The instructions for propagating the changed addressee category may include instructions for propagating the changed addressee category in response to receiving an email owner approval. The one or more instances of the received email may include one or more of received emails, forwarded emails, and reply emails.

The computer program product may also include instructions for receiving a request to change one or an email text characteristic and an email priority characteristic. The computer program product may also include instructions for propagating a changed email text characteristic or an email priority characteristic to the one or more instances of the received email.

According to yet another implementation, a system may include a processor and a memory architecture coupled with the processor. A first software module may be executable by the processor and the memory architecture. The first software module may be configured to receive a request to change an addressee category of a received email. A second software module may also be executable by the processor and the memory architecture. The second software module may be configured to receive an indication of a changed addressee category. A third software module may also be executable by the processor and the memory architecture. The third software module may be configured to propagate the changed addressee category to one or more instances of the received email.

One or more of the following features may be included. The addressee category may include one or more of a to recipient category, a carbon copy recipient category, and a blind carbon copy recipient category. The changed addressee category may include one or more of a to recipient category, a carbon copy recipient category, and a blind carbon copy recipient category. The changed addressee category may be limited to one or more of to recipient category and a carbon copy recipient category.

The third software module, configured to propagate the changed addressee category, may be configured to propagate the changed addressee category in response to receiving an email owner approval. The one or more instances of the received email may include one or more of received emails, forwarded emails, and reply emails.

The system may further include a fourth software module, executable by the processor and the memory architecture, may be configured to receive a request to change one or an email text characteristic and an email priority characteristic. A fifth software module, executable by the processor and the memory architecture, may be configured to propagate a changed email text characteristic or an email priority characteristic to the one or more instances of the received email.

The details of one or more implementations are set forth in the accompanying drawings and the description below. Other features will become apparent from the description, the drawings, and the claims.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium (also herein referred to as a computer readable medium and/or a storage device associated with a computing device or client electronic device) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable or computer-readable medium may be any non-transitory medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
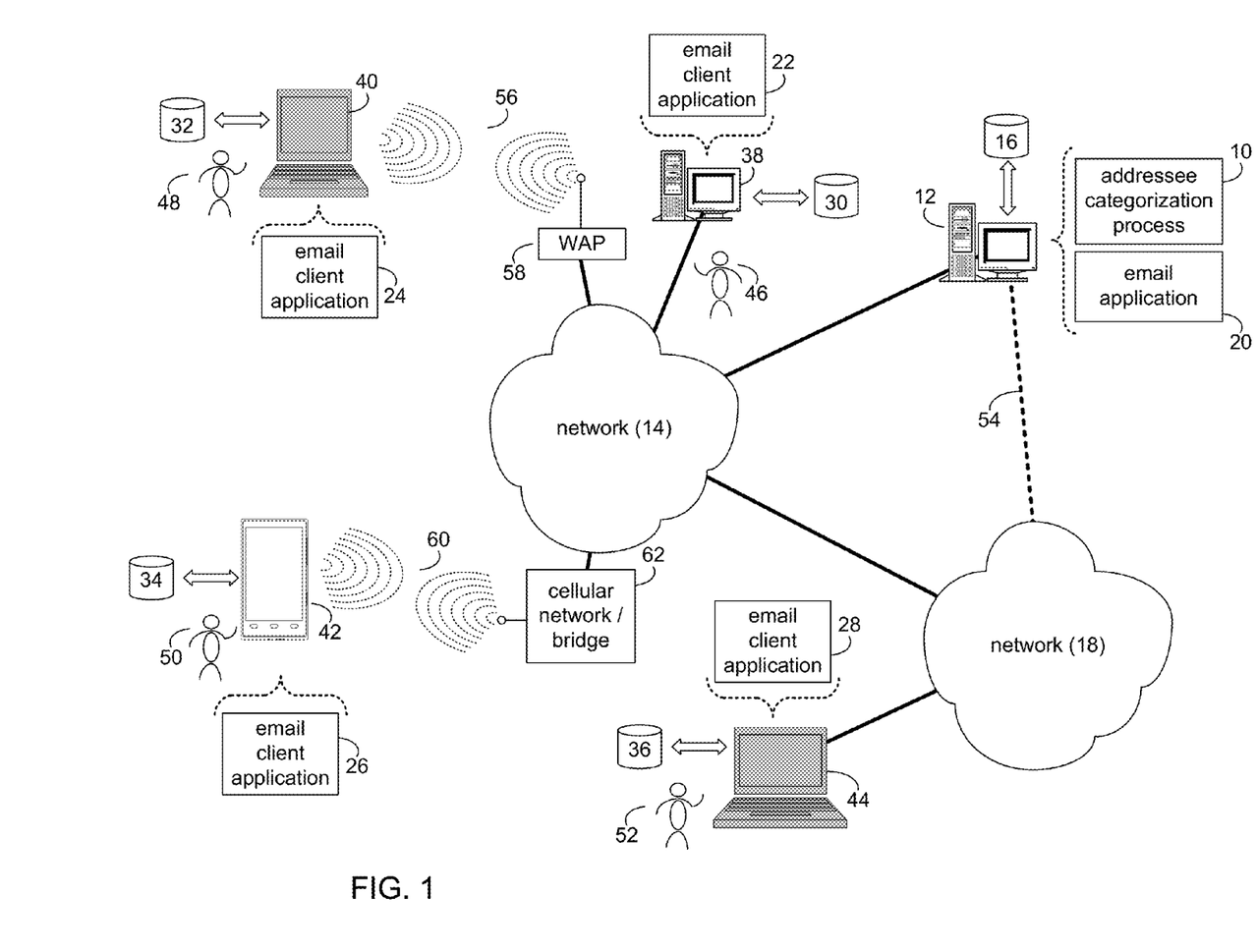
FIG. 1 diagrammatically depicts an addressee categorization process coupled to a distributed computing network.

Referring to FIG. 1, there is shown addressee categorization process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the arrival time process may reside on and be executed, in whole or in part, by a client electronic device, such as a personal computer, notebook computer, personal digital assistant, or the like.

As will be described in greater detail below, addressee categorization process 10 may receive a request to change an addressee category of a received email. Addressee categorization process 10 may also receive an indication of a changed addressee category. Addressee categorization process 10 may propagate the changed addressee category to one or more instances of the received email.

The instruction sets and subroutines of addressee categorization process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an email server application (e.g., email application 20), examples of which may include, but are not limited to e.g., IBM® Lotus® Domino® Server and Microsoft Exchange® Server (IBM, Lotus, and Domino are registered trademarks of International Business Machines Corporation in the United States, other countries or both; Exchange is a registered trademark of Microsoft Corporation in the United States, other countries or both). The instruction sets and subroutines of scheduling application 20, which may be stored on storage device 16 coupled to server computer 12 may be executed by one or more processors (not shown) and one or more memory modules (not shown) incorporated into server computer 12.

Email application 20 may route electronic mail messages to email client applications, e.g., email client applications 22, 24, 26, 28, thereby allowing electronic mail interactions. Examples of email client application 22, 24, 26, 28 may include, but are not limited to, e.g., Lotus Notes® and Microsoft Outlook® (Lotus Notes is a registered trademark of International Business Machines Corporation in the United States, other countries, or both; and Outlook is a registered trademark of Microsoft Corporation in the United States, other countries, or both).

Addressee categorization process 10 may be a stand alone application, or may be an applet/application/script that may interact with and/or be executed within email application 20. In addition/as an alternative to being a server-side process, the addressee categorization process may be a client-side process (not shown) that may reside on a client electronic device (described below) and may interact with an email client application (e.g., one or more of email client applications 22, 24, 26, 28). Further, the addressee process may be a hybrid server-side/client-side process that may interact with email application 20 and an email client application (e.g., one or more of email client applications 22, 24, 26, 28). As such, the addressee categorization process may reside, in whole, or in part, on server computer 12 and/or one or more client electronic devices.

The instruction sets and subroutines of email client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, tablet computer or the like), notebook computer 44, for example. Using client applications 22, 24, 26, 28, users 46, 48, 50, 52 may access messaging application 20 and may allow users to e.g., send and receive instant messaging communications.

Users 46, 48, 50, 52 may access email application 20 directly through the device on which the email client application (e.g., email client applications 22, 24, 26, 28) is executed, namely client electronic devices 38, 40, 42, 44, for example. Users 46, 48, 50, 52 may access email application 20 directly through network 14 or through secondary network 18. Further, server computer 12 (i.e., the computer that executes scheduling application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Mobile computing device 42 is shown wirelessly coupled to network 14 via wireless communication channel 60 established between mobile computing device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the purpose of the following description, client electronic device 38 and email client application 22 may be discussed. However, this is for illustrative purposes only and should not be construed as a limitation of the present disclosure, as other client electronic device (e.g., client electronic devices 40, 42, 44) and other email client applications (e.g., email client applications 24, 26, 28) may be equally utilized.

Figure 2:
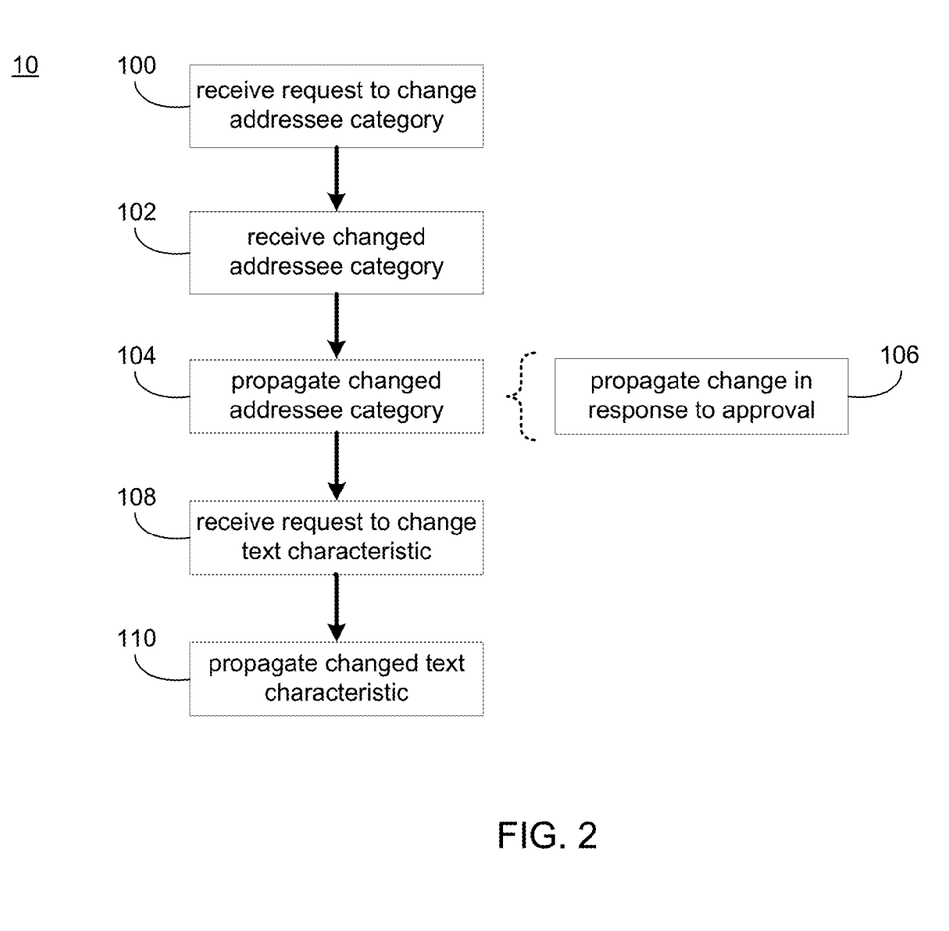
FIG. 2 is a flowchart of a process executed by the addressee categorization process of FIG. 1.

Referring also to FIG. 2, addressee categorization process may receive 100 a request to change an addressee category of a received email. Addressee categorization process 10 may also receive 102 an indication of a changed addressee category. The changed addressee category may be propagated 104 to one or more instances of the received email.

Figure 3:
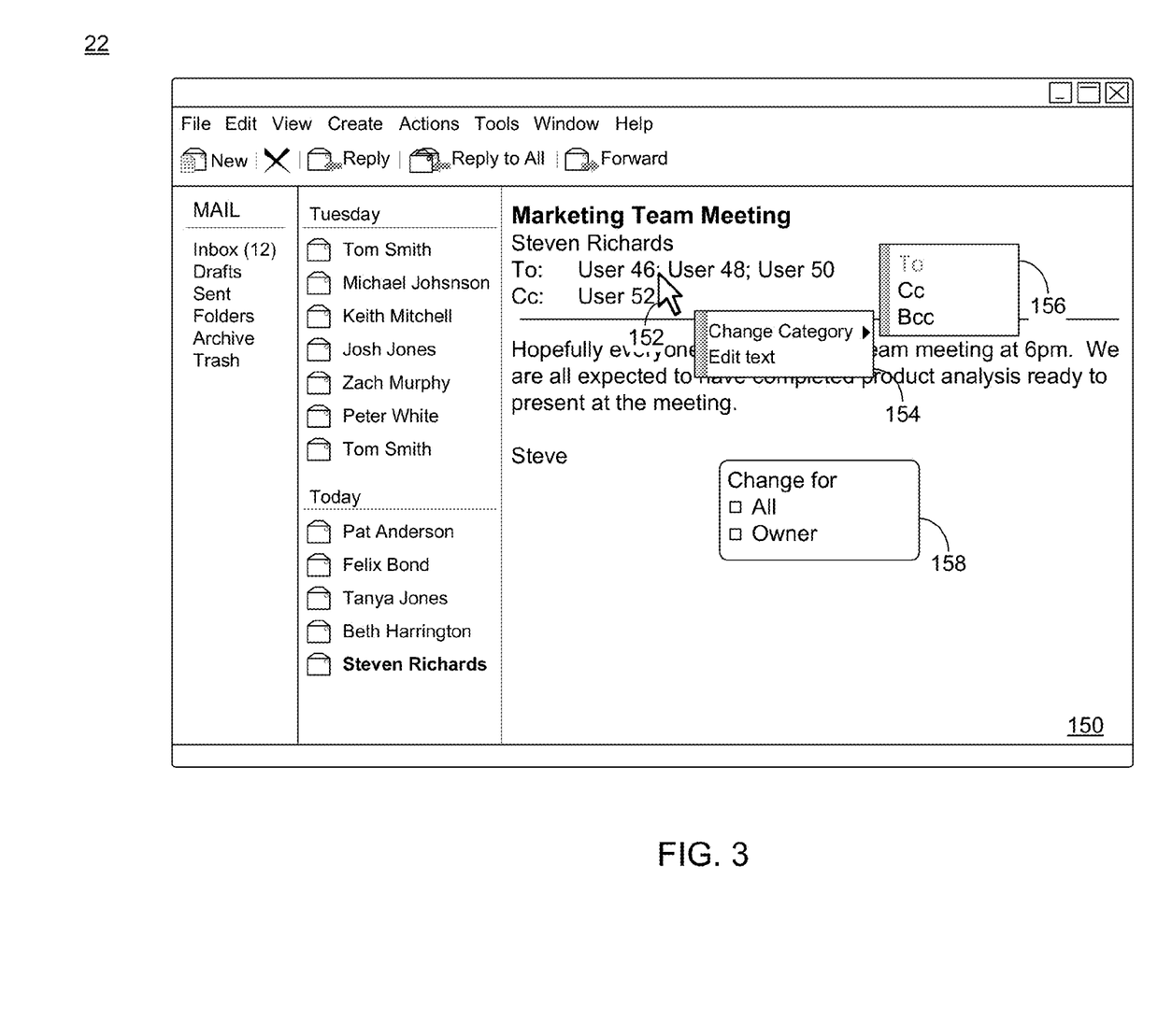
FIG. 3 graphically depicts a user interface rendered by an email application alone, or in conjunction with the addressee categorization process of FIG. 1.

For example, and referring also to FIG. 3, email 150 may be sent to a plurality of recipients, and may be received by the recipients via email client applications (e.g., email client application 22 associated with user 46). The plurality of recipients may include "to" recipients (e.g., user 46, user 48, and user 50 in the example of email 150), "cc," or carbon copy, recipients (e.g., user 52 in the example of email 150), as well as "bcc," or blind carbon copy, recipients. One or more of the recipients (e.g., user 46 in the instant example) may feel that they have been included in the wrong category of recipient. For example, assume that user 40 is not part of the marketing team, but rather only has tangential relations with the marketing team. As such, user 46 may feel that, while inclusion on email 150 may be useful, it is not critical. As such, user 46 may believe that he should be included as a "cc" recipient rather than a "to" recipient.

In view of user 46's belief that he should be placed in a different recipient category, user 46 may seek to motivate a change in recipient category. For example, user 46 may select, via onscreen pointer 152 (e.g., which may be controlled by a pointing device such as a mouse, etc.; not shown) the recipient address "user 46" in email 150, e.g., by right-clicking (or other suitable mechanism) on the recipient address "user 46." In response to user 46 selecting the recipient address "user 46" within email 150 email client application 22 (alone and/or in conjunction with addressee categorization process 10) may render popup 154. Popup 154 may include a variety of options, namely "change category" and "edit text" in the illustrative example. While popup 154 is only shown including two options in the illustrative example, this should not be construed as a limitation, as various additional/alternative options may be included, depending upon design choice and user preference.

User 46 may select (e.g., via onscreen pointer 152) the "change category" option from within popup 154. In response to user 46 selecting the "change category" option from within popup 154, email client application 22 (alone and/or in conjunction with addressee categorization process 10) may render category popup 156. As shown in FIG. 3, category popup 156 may include addressee category options that may be selected. For example category popup 156 may include addressee categories "To," "Cc," and "Bcc" (of which "To" category may be grayed-out, as user 46 may already be included as a "to" recipient of email 150). Assume for the purpose of example, user 46 may wish to be re-categorized as a "cc" recipient. Accordingly, user 46 may select (via onscreen pointer 152) the "Cc" option from within category popup 156. In various embodiments, the category to which an email recipient may be changed may be limited. For example, in some embodiments, user may be prohibited from changing addressee category to "bcc" recipient. Various additional/alternative configurations may be similarly implemented depending upon design criteria and user preference.

As also shown in FIG. 3, addressee categorization process 10 may be configured to allow user 46 to decide if the re-categorization should be made for all recipients of email 150 or only for the owner of email 150 (i.e., the originator of the email, Steven Richards in the instant example). In such an embodiment, upon user 46 selecting an addressee category from within category popup 156, email client application 22 (alone and/or in conjunction with addressee categorization process 10) may render popup 158, which may include the options "All," and "Owner." Of course, popup 158 may include additional/alternative options depending upon design criteria and user preference. Assume for the purpose of example that user 46 may wish the re-categorization be made for all recipients of email 150. Accordingly, user 46 may select (via onscreen pointer 152) the "All" option from within popup 158.

In response to user 46 making the desired selection for changing his addressee category (e.g., via popups 154, 156, 158), addressee categorization process 10 may receive 100 a request to change the addressee category associated with user 46 for email 150 (e.g., which request may be received by a client-side addressee categorization process, and/or may be transmitted to server-side addressee categorization process 10). Additionally, addressee categorization process 10 may receive 102 an indication of a changed addressee category (e.g., a change from "to" recipient to "cc" recipient for user 46 and email 150 in the foregoing example). Further, and as will be discussed in greater detail below, addressee categorization process 10 may propagate 104 the changed addressee category to one or instances of the received email.

Figure 4:
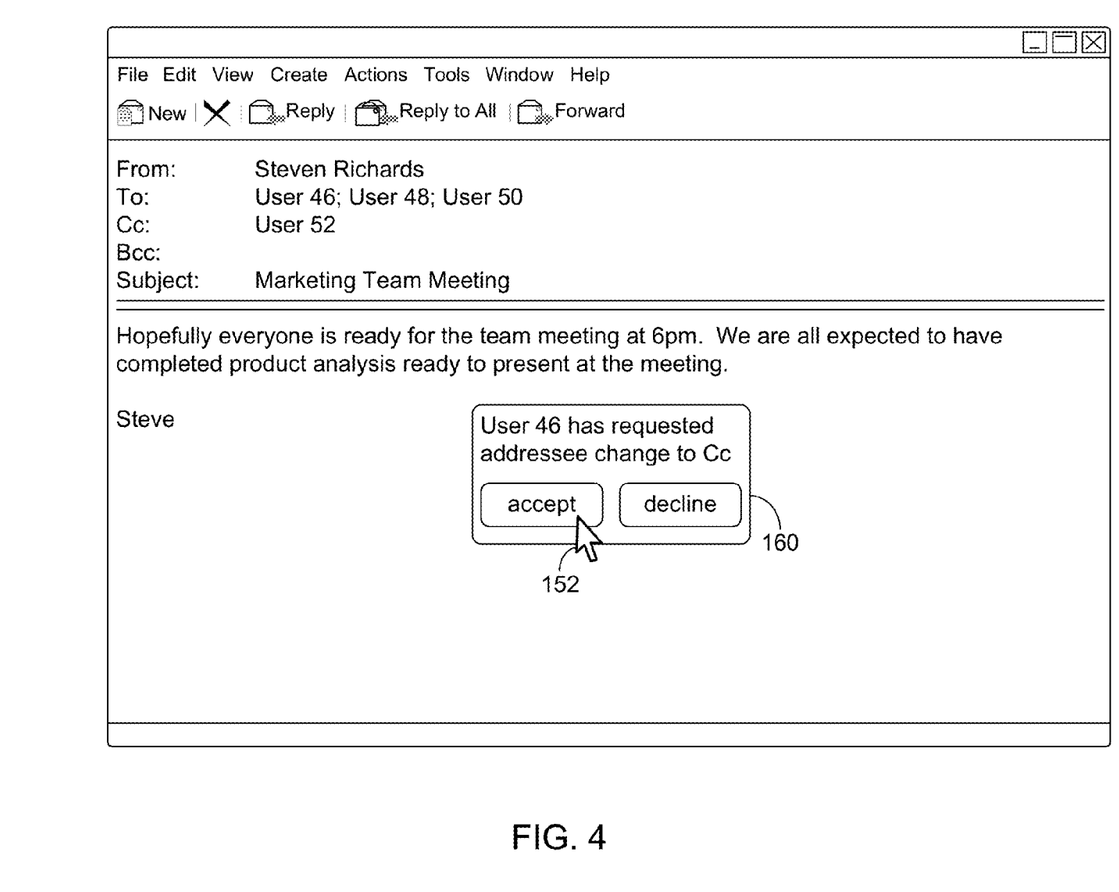
FIG. 4 graphically depicts a user interface rendered by an email application alone, or in conjunction with the addressee categorization process of FIG. 1.

According to an embodiment, approval of the email owner (e.g., the original sender of the email) may be required before an addressee category change can be made. Email owner approval may be required for all changes, only for changes to be propagated 104 to all email recipients, for changes to a specific category (e.g., a category change to a "bcc" recipient), etc. In an embodiment in which email owner approval may be required before the changed addressee category may be propagated 104, an approval request may be transmitted to the email owner. For example, and referring also to FIG. 4, addressee categorization process 10 (alone and/or in conjunction with one or more of email application 20 and an email client application) may transmit an approval request. For example, as shown the email owner (i.e., Steven Richards in the illustrative example) may receive approval popup 160 (e.g., which may be rendered by an email client application, or other application, associated with Steven Richards). As shown, approval popup 160 may include the options to "accept" or "decline" the requested addressee category change. Assuming the email owner may accept the change, the email owner may select (e.g., via onscreen pointer 152) the "accept" button within approval popup 160. In response to the email owner selecting the "accept" button within approval popup 160, addressee categorization process 10 may receive an indication of approval of the email owner for the addressee category change. Accordingly, addressee categorization process 10 may propagate 106 the changed addressee category in response to receiving an email owner approval.

While the foregoing has described a possible implementation for email owner approval of an addressee category change, it should be appreciated that email owner approval may be achieved through a variety of different mechanisms depending upon design criteria and user preference. Additionally, approval may be based upon, at least in part, rules that may be established by individual users and/or system-wide rules. For example, rules may be established that requests for addressee category changes from specified users (and/or classes of users) may always be approved, etc. Various additional and/or alternative rules and/or mechanisms may also/alternatively be utilized. Additionally, it may be possible for individual users, and/or groups or classes of users, to disable the addressee category changing ability for emails of which they are the owner.

As mentioned above, addressee categorization process 10 may propagate 104 the changed addressee category (e.g., the change of user 46 from being a "to" recipient to being a "cc" recipient in the above-example) to one or more instances of the received email. As used herein, an instance of the receive email may include an email based upon, at least in part, the original email sent by the email owner. For example, an instance of the received email may include the email received by each of the email recipients (e.g., user 46, user 48, user 50 and user 52, in the example of email 150) resulting from the original email sent by the email owner. Additionally, an instance of the received email may include any email sent by any recipient as a reply to the original email, and may include any email sent by any recipient (or the email owner) as a forward of the original email, as well as replies to replies, forwards of replies, etc. Propagating 104 the changed addressee category may utilize historical data regarding email 150 that may be maintained by email application 20. The historical data may include an indication of all recipients of received email 150, as well as an indication of occurrences of replies, forwards, and the like.

Propagating 104 the changed addressee category may result in one or more instances of the receive email being updated and/or modified to reflect the change in addressee category. For example, and referring also to FIG. 5, an updated instance 150a of received email 150 may include user 46 as a "cc" recipient, rather than a "to" recipient, as was the case in the original received email 150.

Figure 5:
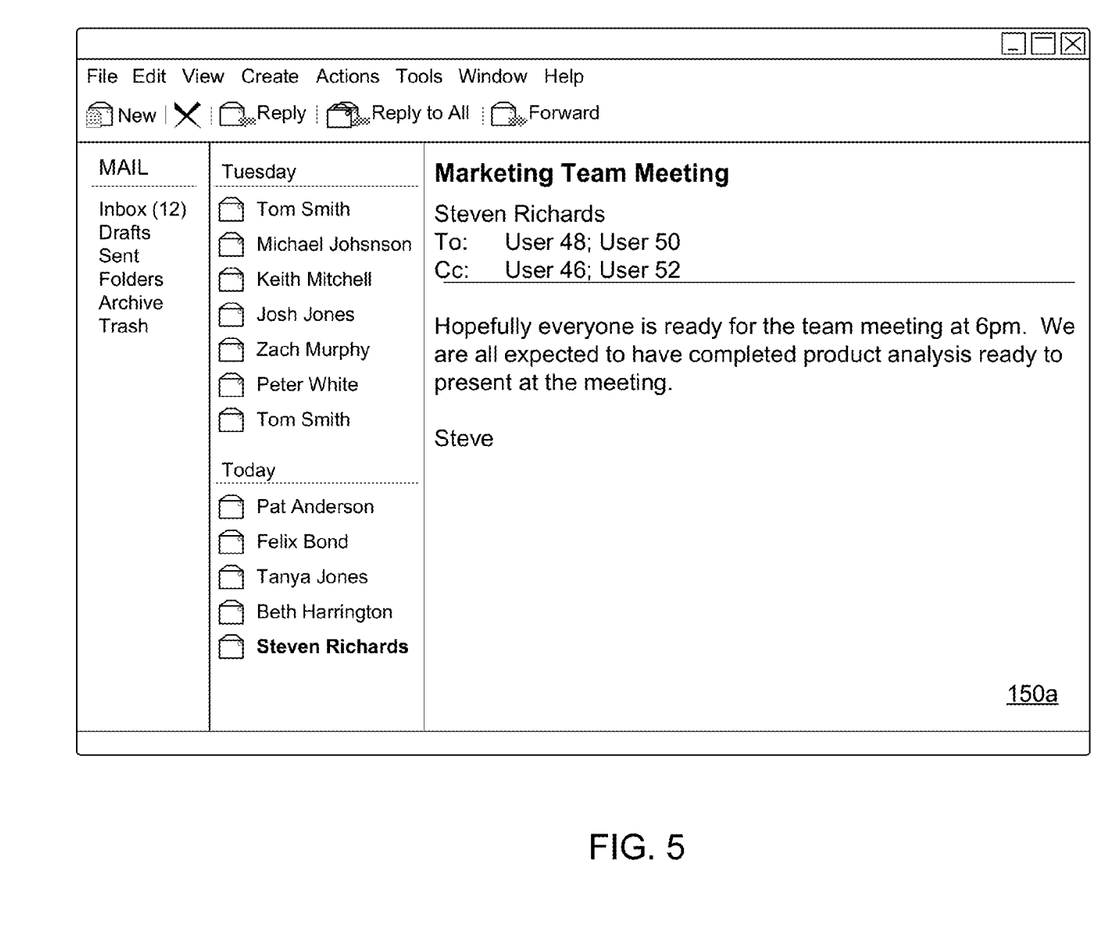
FIG. 5 graphically depicts a user interface rendered by an email application alone, or in conjunction with the addressee categorization process of FIG. 1.

As a result of the changed addressee category associated with user 46 being propagated 104, any replies to email 150a and/or forwards of email 150a may include user 46 as a "cc" recipient rather than a "to" recipient. As discussed above, the one or more instances of the received email may include replies to the received email, forwards of the received email, etc. As such, the category change propagated 104 to the one or more instances of the received email may also change user 46's addressee category in all such reply emails and forwarded emails that occurred before the change was propagated 104 by addressee categorization process 10.

As noted above, the change may, in some embodiments, be propagated 104 to less than all instances of the received email. For example, the change may only be propagated to the owner of the email based upon, at least in part, user 46 selecting "owner" from within popup 158. Additionally, other options may be included in which the change may be propagated to select recipients of the received email, groups/categories of recipients of the received email, or the like.

Figure 6:
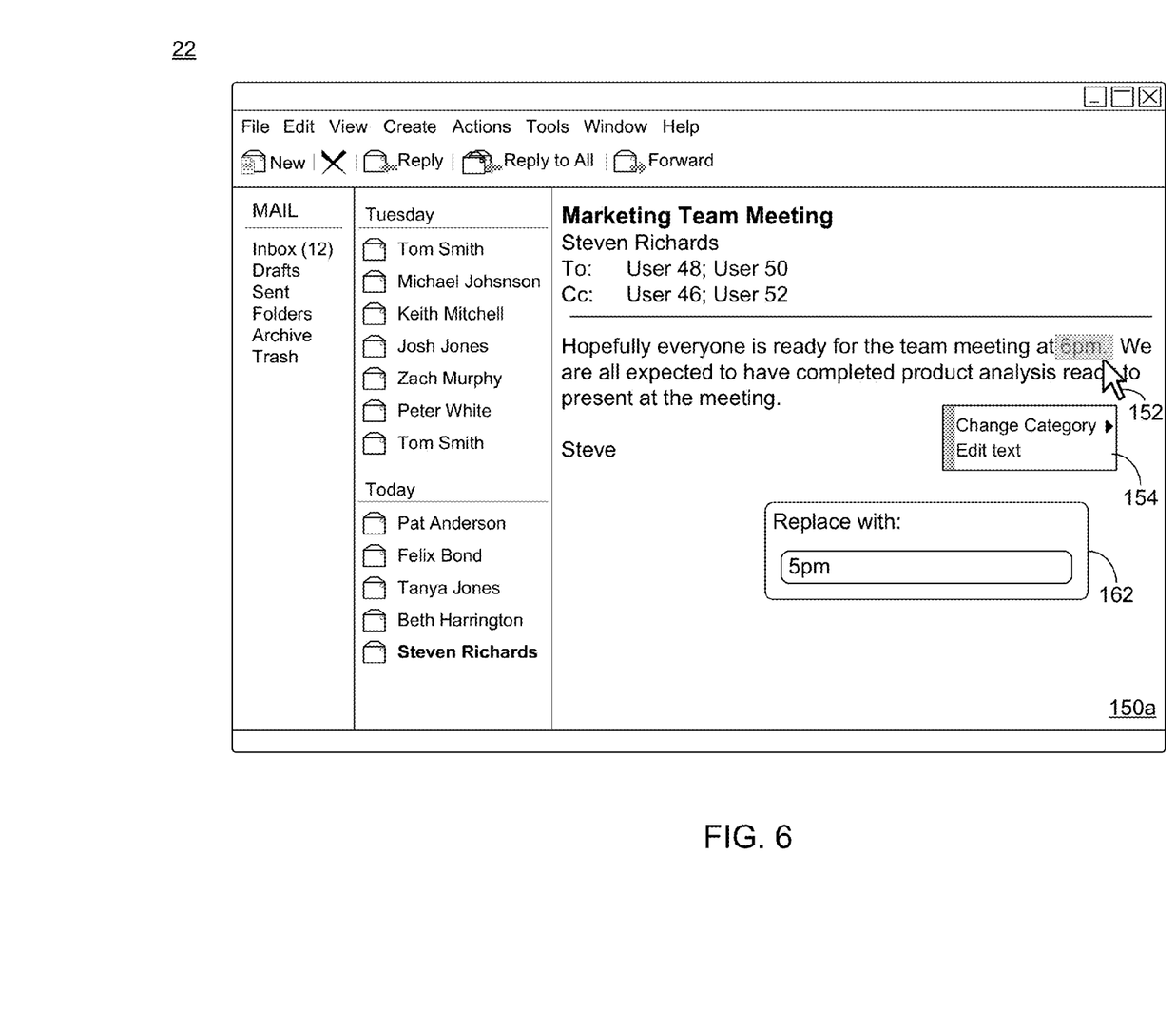
FIG. 6 graphically depicts a user interface rendered by an email application alone, or in conjunction with the addressee categorization process of FIG. 1.

Referring also to FIG. 6, addressee categorization process 10 may further receive 108 a request to change one or more of an email text characteristic and an email priority characteristic, or the like. Addressee categorization process 10 may propagate 110 a changed email text characteristic or an email priority characteristic to the one or more instances of the received email. For example, an in a similar manner as described above, an email recipient may also wish to edit a text characteristic, such as text within the subject line of the email, or within the body of the email, or change a priority characteristic (e.g., changing an importance flag, or the like). Accordingly, the email recipient (e.g., user 46) may select, within email 150a in the illustrated example, a desired text characteristic to be changed using onscreen pointer 152. For example, assume that user 46 realizes that the time for the team meeting should be "5 pm" rather than "6 pm," as recited by the original email. User 46 may select, via onscreen pointer 152, the time "6 pm." User 46 may right-click the selected text, resulting in email client application 22 (alone and/or in conjunction with addressee categorization process 10) render popup 154. User 46 may select the "edit text" option from within popup 154, which may result in email client application 22 (alone and/or in conjunction with addressee categorization process 10) rendering popup 162. User 46 may enter the changed text within popup 162, and click the "Done" button within popup 162. In response to user 46 entering text within popup 162 and clicking the "Done" button, addressee categorization process 10 may receive 108 a request to change the text "6 pm" to "5 pm." Further, addressee categorization process 10 may propagate 110 the changed email text characteristic (in the instant example) to the one or more instances of the received email.

Consistent with the foregoing feature, rather then sending an updated email correcting the error, addressee categorization process 10 may allow the error (or other change) to be made to one or more instances of the received email by propagating 110 the change to the one or more instances of the received email. Additional features, such as seeking email owner approval as described above, may also be implemented in conjunction with changing an email text characteristic and/or email priority characteristic.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
   receiving, by a computing device, a request to change an addressee category of a received email, received by a plurality of users, without drafting a response to the received email, wherein the received email is included within an email chain;
   receiving, by the computing device, an indication of the changed addressee category;
   propagating, by the computing device, the changed addressee category to each instance of the received email received by the plurality of users; and updating the changed addressee category in said each instance of the received email received by the plurality of users, wherein the updating the changed addressee category occurs in said each instance of the received email received, by the plurality of users, before said propagating the changed addressee category to said each instance.

2. The method according to claim 1, wherein the addressee category includes one or more of a to recipient category, a carbon copy recipient category, and a blind carbon copy recipient category.

3. The method according to claim 1, wherein the changed addressee category includes one or more of a to recipient category, a carbon copy recipient category, and a blind carbon copy recipient category.

4. The method according to claim 1, wherein the changed addressee category is limited to one or more of to recipient category and a carbon copy recipient category.

5. The method according to claim 1, wherein propagating the changed addressee category includes propagating the changed addressee category in response to receiving an email owner approval.

6. The method according to claim 1, wherein the each instance the received email includes one or more of received emails, forwarded emails, and reply emails.

7. The method according to claim 1, further comprising receiving a request to change one or more of an email text characteristic and an email priority characteristic; and propagating a changed email text characteristic or an email priority characteristic to said each instance of the received email.

8. A computer program product comprising a non-transitory computer readable medium having a plurality of instructions stored thereon, which, when executed by a processor, cause the processor to perform operations comprising:
receiving a request to change an addressee category of a received email received by a plurality of users without drafting a response to the received email, wherein the received email is included within an email chain;
receiving an indication of the changed addressee category;
propagating the changed addressee category to each instance of the received email received by the plurality of users; and
updating the changed addressee category in said each instance of the received email received by the plurality of users, wherein the updating the changed addressee category occurs in said each instance of the received email received, by the plurality of users, before said propagating the changed addressee category to said each instance.

9. The computer program product according to claim 8, wherein the addressee category includes one or more of a to recipient category, a carbon copy recipient category, and a blind carbon copy recipient category.

10. The computer program product according to claim 8, wherein the changed addressee category includes one or more of a to recipient category, a carbon copy recipient category, and a blind carbon copy recipient category.

11. The computer program product according to claim 8, wherein the changed addressee category is limited to one or more of a to recipient category and a carbon copy recipient category.

12. The computer program product according to claim 8, wherein the instructions for propagating the changed addressee category include instructions for propagating the changed addressee category in response to receiving an email owner approval.

13. The computer program product according to claim 8, wherein said each instance of the received email includes one or more of received emails, forwarded emails, and reply emails.

14. The computer program product according to claim 8, further comprising instructions for receiving a request to change one or an email text characteristic and an email priority characteristic; and instructions for propagating a changed email text characteristic or an email priority characteristic to the one or more instances of the received email.

15. A system comprising:
a processor;
a memory coupled with the processor;
a first software module stored in the memory and executable by the processor, the first software module configured to receive a request to change an addressee category of a received email received by a plurality of users without drafting a response to the received email, wherein the received email is included within an email chain;
a second software module stored in the memory and executable by the processor, the second software module configured to receive an indication of the changed addressee category; and
a third software module stored in the memory and executable by the processor, the third software module configured: to propagate the changed addressee category to each instance of the received email received by the plurality of users; and update the changed addressee category in said each instance of the received email received by the plurality of users, wherein the update the changed addressee category occurs in said each instance of the received email received, by the plurality of users, before propagating the changed addressee category to said each instance.

16. The system according to claim 15, wherein the addressee category includes one or more of a to recipient category, a carbon copy recipient category, and a blind carbon copy recipient category.

17. The system according to claim 15, wherein the changed addressee category includes one or more of a to recipient category, a carbon copy recipient category, and a blind carbon copy recipient category.

18. The system according to claim 15, wherein the changed addressee category is limited to one or more of to recipient category and a carbon copy recipient category.

19. The system according to claim 15, wherein the third software module, configured to propagate the changed addressee category, is configured to propagate the changed addressee category in response to receiving an email owner approval.

20. The system according to claim 15, wherein said each instance of the received email includes one or more of received emails, forwarded emails, and reply emails.

21. The system according to claim 15, further comprising: a fourth software module stored in the memory and executable by the processor, the fourth software module configured to receive a request to change one or an email text characteristic and an email priority characteristic; and a fifth software module stored in the memory and executable by the processor, the fifth software module configured to propagate a changed email text characteristic or an email priority characteristic to the one or more instances of the received email.

* * * * *